US006976479B1

(12) United States Patent
Gottemoller et al.

(10) Patent No.: US 6,976,479 B1
(45) Date of Patent: Dec. 20, 2005

(54) ENGINE WITH OPTIMIZED ENGINE CHARGE AIR-COOLING SYSTEM

(75) Inventors: Paul Gottemoller, Palos Park, IL (US); Michael B. Goetzke, Orland Park, IL (US); Gary R. Svihla, Chicago, IL (US)

(73) Assignee: Electro-Motive Diesel, Inc., LaGrange, IL (US)

( * ) Notice: Subject to any disclaimer, the term of this patent is extended or adjusted under 35 U.S.C. 154(b) by 0 days.

(21) Appl. No.: 10/914,816

(22) Filed: Aug. 10, 2004

(51) Int. Cl.$^7$ .......................... F02B 29/04; F02B 33/00
(52) U.S. Cl. ...................... 123/559.1; 60/599; 123/563
(58) Field of Search ...................... 60/599; 123/559.1, 123/563

(56) References Cited

U.S. PATENT DOCUMENTS

| | | | | |
|---|---|---|---|---|
| 4,385,594 | A | * | 5/1983 | Hauser, Jr. .................. 123/563 |
| 4,989,552 | A | * | 2/1991 | Obermayer et al. ........ 123/563 |
| 6,227,179 | B1 | * | 5/2001 | Eiermann et al. ........... 123/563 |
| 6,910,469 | B2 | * | 6/2005 | Renkonen .................... 123/563 |

FOREIGN PATENT DOCUMENTS

| | | | | |
|---|---|---|---|---|
| FR | 2645209 A1 | * | 10/1990 | ........... F02B 29/04 |
| WO | WO 00/40844 A1 | * | 7/2000 | ........... F02B 29/04 |

* cited by examiner

Primary Examiner—Sheldon J Richter
(74) Attorney, Agent, or Firm—Cook, Alex, McFarron, Manzo, Cummings & Mehler, td.

(57) ABSTRACT

An optimized engine charge air-cooling system for an internal combustion engine includes a charge air cooler side mounted along an outboard side of each engine cylinder bank of the engine. The charge air coolers extend the full length of the cylinder banks. The charge air coolers each include a housing, a core, an air inlet and an air outlet. The charge air cooler inlets are connected to an outlet of a compressed air source, such as a turbocharger, through cooler intake headers. The charge air cooler outlets are connected through cooler outlet headers to cylinder intake ports of cylinders in the cylinder banks. The design of the charge air-cooling system allows for highly effective cooling of charge air with a corresponding small drop in charge air pressure. These features combine to achieve the result of decreased engine nitrogen oxides (NOx) production and increased engine fuel economy.

20 Claims, 2 Drawing Sheets

ENGINE WITH OPTIMIZED ENGINE CHARGE AIR-COOLING SYSTEM

TECHNICAL FIELD

This invention relates to internal combustion engines and, more particularly, to an engine with an efficient, optimized charge air-cooling system that provides lower engine cylinder air inlet temperatures resulting in reduced NOx emissions and improved fuel economy.

BACKGROUND OF THE INVENTION

It is known in the art of internal combustion engines, especially those engines used for transportation vehicles, to use charge air coolers to cool hot, compressed charge air discharged from a compressor, such as a turbocharger, prior to delivery to the engine combustion chambers. Charge air coolers are used to cool and reduce the volume of the compressed intake air to increase the mass of the inlet air charge and to operate with cooler combustion temperatures.

Regulations controlling emissions of nitrogen oxides (NOx) are becoming increasingly difficult to meet. Problematically, however, most engine modifications that reduce NOx production concurrently cause the negative result of decreased fuel economy. Therefore, a need exists for an engine having reduced NOx emissions without reduced fuel economy.

SUMMARY OF THE INVENTION

Through testing we have discovered that there is an operating change that improves emissions (reduces NOx), reduces fuel consumption, and improves reliability. We have found that by lowering the temperature of air entering the engine cylinders relative to ambient temperature, NOx levels drop and fuel consumption is reduced. As a result, we have developed an optimized design for charge air cooling of GM 12 and 16 cylinder model V265H turbocharged diesel engines designed primarily for use in railway locomotives but usable for other vehicle and stationary applications. The inventive concepts of the design may be applicable to other engine configurations and applications as well as to the engine models indicated.

The present invention provides a high efficiency charge air cooler (aftercooler) having a core volume which is substantially increased over the size of previous aftercooler designs relative to the total cylinder displacement of the engines to which they are applied. For example, aftercooler core/engine displacement ratios for various somewhat comparable railway locomotive engines vary from about 0.32 to about 0.85 while the ratio for the GM model V265H engine is increased to 1.19, an increase from about 40 percent to 372 percent.

In the preferred embodiment, a charge air cooler is placed outboard of each engine cylinder bank along the side of the engine and extends the full length of the associated engine cylinder bank. The unique use in a medium speed, four-stroke cycle diesel engine having a central camshaft in combination with a 45-degree "V" arrangement makes the engine narrow enough to accept charge air coolers along the length of the sides of the engine. This arrangement of charge air coolers along the length of the engine bank in turn allows for the increased charge air cooler capacity.

Because of the large area of the heat exchanger in the present charge air coolers, they achieve highly effective cooling of the air entering the cylinders relative to the ambient temperatures. This high level of effectiveness is also achieved with a very low pressure drop across the airside of the heat exchangers, on the order of ½ psi under maximum flow conditions. This improved arrangement results in the levels of NOx produced by the engine desirably dropping while fuel economy is improved.

A charge air-cooling system in accordance with the present invention includes a charge air cooler side mounted along an outboard side of each engine cylinder bank of a V-type engine. The charge air coolers extend along the full length of the engine cylinder banks. The charge air coolers may each include a housing having an air inlet and an air outlet. The air inlet is connected through an intake header to an outlet of a charge air source of the engine, such as a turbocharger compressor. The air outlet is connected through a cooler outlet header, acting as an engine intake manifold, to intake ports of cylinders of the engine, through which the cooled charge air passes from the air cooler outlet header to the cylinders.

In a preferred embodiment, the charge air coolers may have full length heat exchanger cores fixed at only one end in the housing and free floating on supports along their length to allow for expansion/contraction due to temperature changes. Each charge air cooler may further include a four pass cross flow heat exchanger core having an airside and a coolant side. The airsides of the heat exchangers may each be connected to their respective charge air cooler housing inlet and outlet. The maximum pressure drop across the airside of the heat exchanger may be on the order of ½ psi. The coolant used for the coolant side of the heat exchanger may be a propylene glycol and water mixture.

These and other features and advantages of the invention will be more fully understood from the following description of certain specific embodiments of the invention taken together with the accompanying drawings.

DESCRIPTION OF THE PREFERRED EMBODIMENT

Figure 1:
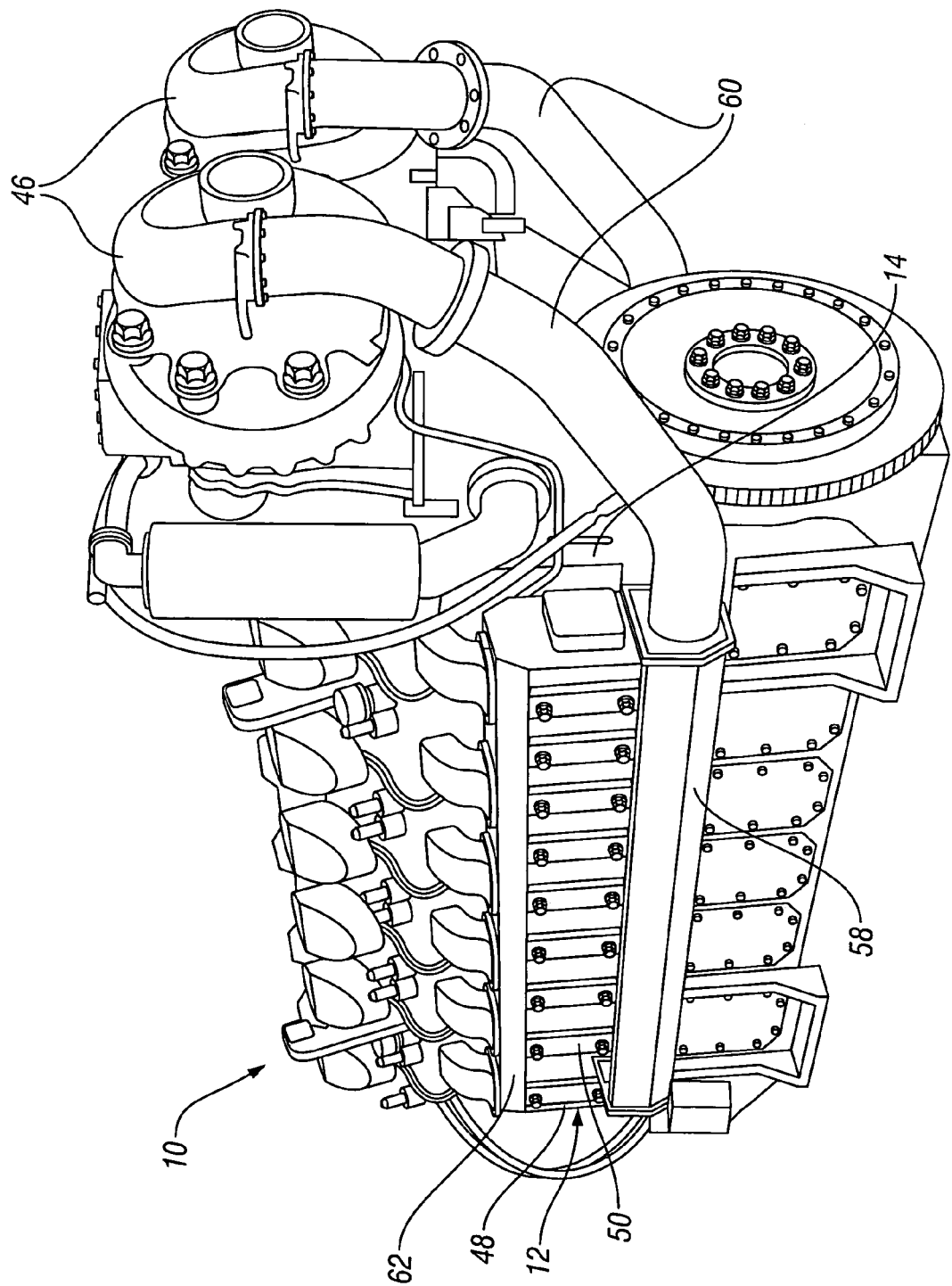
FIG. 1 is a perspective view of a turbocharged diesel engine including an optimized charge air-cooling system in accordance with the present invention.
Figure 2:
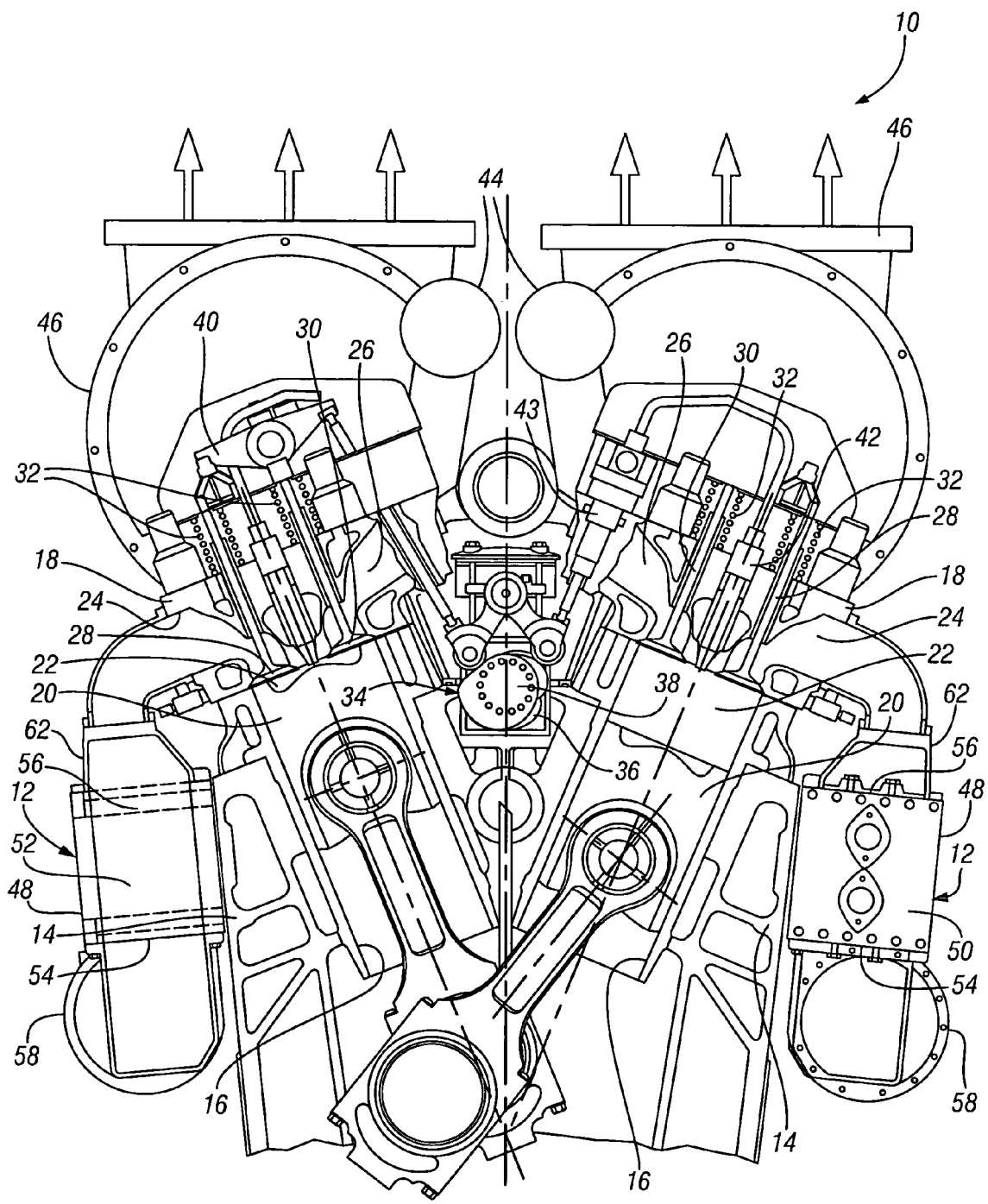
FIG. 2 is a transverse cross-sectional view of the embodiment of FIG. 1.

Referring now to FIGS. 1 and 2 of the drawings in detail, numeral 10 generally indicates a GM model 12V265H turbocharged diesel engine designed for railway locomotive applications but usable in other applications, such as marine power and mobile and stationary power plants. Engine 10 includes an optimized engine charge air-cooling system 12 in accordance with the present invention. Charge air-cooling system 12 achieves a reduction in the amount of NOx produced by the engine while at the same time increasing fuel economy and engine reliability.

The engine 10 has two cylinder banks 14, each having a plurality of cylinders 16 closed by cylinder heads 18. Pistons 20, reciprocable within the cylinders, define variable volume combustion chambers 22 between the pistons 20 and cylinder heads 18. The cylinder heads 18 contain intake and exhaust ports 24, 26, respectively, that communicate with the combustion chambers and are controlled by intake and exhaust valves 28, 30, respectively, which are mounted in the cylinder heads and biased by valve springs 32. The valves 28, 30 are mechanically actuated by intake and exhaust cams 34, 36, respectively, of a camshaft 38 driving an associated valve actuating mechanism such as intake rocker arm 40. Fuel injection valves 42 are pressure actuated by camshaft driven injection pumps 43. The exhaust ports 26 are connected to exhaust manifolds 44, which are in turn connected to turbochargers 46.

In a preferred embodiment of the present invention, the charge air-cooling system 12 includes charge air coolers 48 that are side mounted to each of the outboard sides of the cylinder banks 14 of the engine 10. As illustrated in FIG. 1, the charge air coolers 48 extend along the full length of the engine cylinder banks 14. The engine 10, having a central camshaft in combination with a 45-degree "V" arrangement, is narrow enough to accept the charge air coolers 48 of the charge air-cooling system 12 along the length of outboard sides of their respective engine banks 14. The charge air coolers 48 each include a housing 50 and a heat exchanger core 52 within the housing. The core 52 is fixed at only one end to the housing 50 and is free floating along its length on supports in the housing. This allows for expansion of the core 52 as the temperature of the core increases. Each charge air cooler core 52 may also be arranged on the coolant side as a four pass cross flow heat exchanger.

Each charge air cooler housing 50 includes an air inlet 54 and an air outlet 56. The charge air-cooler air inlet 54 is connected through an intake header 58 to an air outlet 60 of a compressed air source, in this case a turbocharger 46. The charge air cooler air outlet 56 is connected through a cooler outlet header 62, acting as an engine intake manifold, to the cylinder intake ports 24.

The engine cycle conventionally includes intake, compression, expansion and exhaust strokes of the pistons. Intake charges drawn into the combustion chambers 22 from the cylinder intake ports 24 on the intake strokes are compressed with the valves closed. Fuel injected into the combustion chambers 22 is ignited by the compressed gases, and the burned gases expand, producing power. High combustion temperatures in the combustion chambers undesirably cause formation of nitrogen oxides (NOx).

The combustion products are exhausted through the exhaust ports 26 and exhaust manifolds 44 to the turbochargers 46, providing energy to the turbochargers to boost the pressure of the intake charges. The engine pistons draw air into their respective combustion chambers on their intake strokes. At higher engine loads, the turbochargers 46 draw in additional charge air and compress the air, thereby heating it. The pressurized (compressed) charge air is delivered through the turbocharger air outlets 60 and intake headers 58 to the charge air cooler housing inlets 54. Charge air then passes through the heat exchanger cores 52 and exits through the charge air cooler housing outlets 56. Finally, the charge air passes through the cooler outlet headers 62 to the cylinder intake ports 34 at pressures varying with engine operating conditions.

The charge air-cooling system 12 effectively controls NOx production without a loss of fuel economy or engine reliability. In fact, the charge air-cooling system 12 reduces NOx emissions and improves fuel economy. The charge air-cooling system 12 achieves this result by lowering the temperature of the air before it enters the combustion chambers 22 without causing a significant loss of pressure.

Hot, compressed charge air enters the charge air cooler 48 from a compressed air source such as the turbocharger 46. As the charge air passes through the charge air cooler 48, the hot charge air is cooled. When the charge air cooler 48 is designed as a four pass cross flow heat exchanger arrangement and used with a propylene glycol and water mixture as the engine and charge air cooler coolant, the effectiveness of the heat exchange is in the range of 94 to 96 percent. Effectiveness is defined as 100 times the difference between the compressor discharge temperature and the cooler discharge temperature divided by the difference between the compressor discharge temperature and the coolant inlet temperature. Because of the large area of the heat exchanger, made possible by extending the heat exchanger the full length of the engine cylinder bank, this high effectiveness is achieved with a very low pressure drop in the charge air across the airside of the exchanger. Under maximum flow conditions, this pressure drop is on the order of only ½ psi. The lowering of the charge air temperature, while simultaneously maintaining the pressure of the charge air, combines to reduce NOx production while reducing fuel consumption.

In summary, the invention emphasizes the following features:

charge air coolers side mounted along outboard sides of an engine cylinder bank;

charge air coolers extending the full length of the cylinder bank;

a charge air-cooling system having highly effective charge air cooling with a very small drop in air pressure; and a charge air-cooling system that achieves reduced engine NOx emissions and reduced fuel consumption.

While the invention has been described by reference to certain preferred embodiments, it should be understood that numerous changes could be made within the spirit and scope of the inventive concepts described. Accordingly, it is intended that the invention not be limited to the disclosed embodiments, but that it have the full scope permitted by the language of the following claims.

What is claimed is:

1. An engine charge air-cooling system for a transportation vehicle engine having a plurality of cylinders in a cylinder bank, the cylinders having a select cylinder displacement, comprising:

a charge air cooler having a housing and a core;

said charge air cooler housing side mounted along an outboard side of an engine bank of a transportation vehicle engine;

said charge air cooler extending the full length of said engine bank;

said charge air cooler connected in between a compressed air source of said engine and a plurality of cylinder intake ports of said engine;

said charge air cooler having a select core volume such that the ratio of core volume to total cylinder displacement is greater than 0.85.

2. An internal combustion engine comprising:

at least one cylinder bank;

a plurality of cylinders in said cylinder bank;

a cylinder intake port connected to each of said cylinders;

a cylinder exhaust port connected to each of said cylinders;

a compressed air source connected to said exhaust port; and at least one charge air cooler comprising a housing, a core, an air inlet, and an air outlet;

said cylinders having a select cylinder displacement;

said charge air coolers having a select core volume such that the ratio of core volume to total cylinder displacement is greater than 0.85;

said charge air cooler housing side mounted along an outboard side of one of said cylinder bank;

said charge air cooler extending along the length of said cylinder bank;

said charge air cooler air inlet being connected to an outlet of one of said compressed air source;
said charge air cooler air outlet being connected to said cylinder intake ports.

3. The engine of claim 2 including a charge air cooler intake header connected between said compressed air source air outlet and said charge air cooler air inlet.

4. The engine of claim 2 including a charge air cooler outlet header connected between said charge air cooler outlet and said cylinder intake ports.

5. The engine of claim 2, wherein said compressed air source is a turbocharger.

6. The engine of claim 2, wherein said charge air cooler core is fixedly mounted at only one end of said housing and free floating on supports along the length of said housing.

7. The engine of claim 2, wherein each of said charge air cooler cores is a four pass cross flow heat exchanger having an airside and a coolant side.

8. The engine of claim 7, wherein said airside of said heat exchangers is connected to said charge air cooler inlet on one side and to said charge air cooler outlet on another side.

9. The engine of claim 7, wherein maximum air pressure drop across the airside of said heat exchanger is on the order of ½ psi.

10. The engine of claim 7, wherein a coolant used in said coolant side of said heat exchanger comprises a propylene glycol/water mixture.

11. An internal combustion engine comprising:
two opposite cylinder banks;
a plurality of cylinders in each of said cylinder banks, said cylinders disposed in a V arrangement;
a cylinder intake port connected to each of said cylinders;
a cylinder exhaust port connected to each of said cylinders;
two compressed air sources, each connected to said exhaust ports of the cylinders of one of said cylinder banks;
a central camshaft located in between said two cylinder banks for actuating valves in both banks; and
two charge air coolers, each comprising a housing, a core, an air inlet, and an air outlet;
said cylinders having a select cylinder displacement;
said charge air coolers having a select core volume such that the ratio of core volume to total cylinder displacement is greater than 0.85;
each charge air cooler housing side mounted along an outboard side of one of said cylinder banks;
each of said charge air coolers cores extending for substantially the length of one of said cylinder banks;
each of said charge air cooler air inlets being connected to an outlet of one of said compressed air sources;
each of said charge air cooler air outlets being connected to said cylinder intake ports of the cylinders of one of said cylinder banks.

12. The engine of claim 11, wherein the ratio of core volume to total cylinder displacement is approximately 1.19.

13. The engine of claim 11 including a charge air cooler intake header connected between each of said compressed air source air outlets and said charge air cooler air inlets.

14. The engine of claim 11 including a charge air cooler outlet header connected between each of said charge air cooler outlets and said intake ports of the cylinders of one of said cylinder banks.

15. The engine of claim 11, wherein said compressed air sources are turbochargers.

16. The engine of claim 11, wherein each of said charge air cooler cores is fixedly mounted at only one end of said housing and free floating on supports along the length of said housing.

17. The engine of claim 11, wherein each of said charge air cooler cores is a four pass cross flow heat exchanger having an airside and a coolant side.

18. The engine of claim 17, wherein said airside of each of said heat exchangers is connected to said charge air cooler inlet on one side and to said charge air cooler outlet on another side.

19. The engine of claim 17, wherein maximum air pressure drop across the airside of each of said heat exchangers is on the order of ½ psi.

20. The engine of claim 17, wherein a coolant used in said coolant side of said heat exchangers comprises a propylene glycol/water mixture.

* * * * *